UNITED STATES PATENT OFFICE.

JAMES W. CARSON, OF PHILADELPHIA, PA., AND FRANCIS P. HARNED, OF CAMDEN, N. J., ASSIGNORS TO SAID JAMES W. CARSON.

MANUFACTURE OF BLOCKS OF BICARBONATE OF SODA.

SPECIFICATION forming part of Letters Patent No. 338,924, dated March 30, 1886.

Application filed November 14, 1885. Serial No. 182,866. (Specimens.)

*To all whom it may concern:*

Be it known that we, JAMES W. CARSON, a citizen of the United States, residing at Philadelphia, in the State of Pennsylvania, and FRANCIS P. HARNED, a citizen of the United States, residing at Camden, in the county of Camden and State of New Jersey, have invented certain new and useful Improvements in the Manufacture of Blocks, &c., of Bicarbonate of Soda; and we do hereby declare the following to be a full, clear, and exact description of the invention.

Our invention relates to the process of manufacturing cakes, cylinders, or other forms of blocks of bicarbonate of soda which are used for generating carbonic acid in malt and spirituous liquors.

Heretofore cakes or cylinders for the purpose specified have been produced from pure ground dry-bolted carbonate of soda, which, in addition to compression, has required that a gummy or glutinous substance be added to it to retain its shape, or else it has been steamed and dried to produce a film on its surface. The pure dry ground bicarbonate of soda heretofore used is relatively a costly article, and the addition of adhesive material or the steaming process adds to the expense; besides, the pure bicarbonate of soda compressed into cakes, particularly with the addition of gummy or glutinous material, is not quickly soluble, not being of a porous nature.

Our invention has for its object to provide cakes, cylinders, or blocks of bicarbonate of soda produced at a much less expense than heretofore without the employment of gummy or glutinous substance, and without resort to steaming or artificial dampening, such blocks being of a porous nature and more readily soluble than any hitherto manufactured.

Our invention consists in the process of manufacture hereinafter specifically described and claimed.

In carrying our invention into effect we take bicarbonate of soda in what may be called an "unfinished state," or at a stage prior to that in which it is put up for sale or use—namely, direct from the carbonating-chambers of the old or usual process, or, if manufactured by the ammonia process, direct from the washing-table—and while it is yet moist and unground we mold or compress it into blocks, cakes, cylinders, or other forms of any convenient size or sizes, using only sufficient pressure in the molding or compressing as is necessary to retain the articles in shape for carriage to the drying-room. We then place the molded or shaped blocks in an ordinary dry-room, whereby the excess of moisture is drawn out or evaporated and the molded blocks left in a dry condition fit for transportation and use. The blocks or cakes thus produced are of a porous nature, more readily soluble than blocks or cakes of pure merchantable bicarbonate of soda which has been dried, ground, and bolted, as such grinding destroys the crystals and causes the material to become dense to a degree that impairs to some extent its solubility. By our process we avoid the preliminary drying and the subsequent steaming to restore moisture. We dispense with the grinding and bolting, and we produce a cake or block more readily soluble than those made from the ordinary merchantable bicarbonate of soda, and therefore better adapted than the latter to the special purpose for which the article is mainly intended.

We do not herein claim the new product above described and produced by our process, as such product forms the subject of a separate application of ours for Letters Patent—viz., application Serial No. 193,629.

What we claim as our invention is as follows:

In the process of manufacturing sodium bicarbonate, compressing it into blocks immediately on removing it from the carbonating-chambers or the washing-tables and before drying or grinding it, whereby the addition of adhesive matter is rendered unnecessary.

In testimony that we claim the foregoing we have hereunto set our hands this 6th day of November, 1885.

JAMES W. CARSON.
FRANCIS P. HARNED.

Witnesses:
WILL H. POWELL,
R. DALE SPARHAWK.